(12) United States Patent
Fujiwara et al.

(10) Patent No.: US 6,853,106 B2
(45) Date of Patent: Feb. 8, 2005

(54) BRUSHLESS MOTOR

(75) Inventors: Kenji Fujiwara, Hyogo-ken (JP); Akira Nishio, Hyogo-ken (JP); Yoshiki Kato, Hyogo-ken (JP); Masahiro Hirano, Hyogo-ken (JP); Takatoshi Kogure, Hyogo-ken (JP); Tsutomu Baba, 6671-9, Miyagawa, Chino-shi, Nagano-ken (JP)

(73) Assignees: Mitsubishi Heavy Industries, Ltd., Tokyo (JP); Tsutomu Baba, Nagano-ken (JP)

( * ) Notice: Subject to any disclaimer, the term of this patent is extended or adjusted under 35 U.S.C. 154(b) by 24 days.

(21) Appl. No.: 10/030,171

(22) PCT Filed: May 31, 2001

(86) PCT No.: PCT/JP01/04606
§ 371 (c)(1),
(2), (4) Date: May 16, 2002

(87) PCT Pub. No.: WO01/95464
PCT Pub. Date: Dec. 13, 2001

(65) Prior Publication Data
US 2002/0171311 A1 Nov. 21, 2002

(30) Foreign Application Priority Data

Jun. 2, 2000 (JP) ................................. 2000-166119
Nov. 15, 2000 (JP) ................................. 2000-347662

(51) Int. Cl.$^7$ ................................................ H02K 1/00
(52) U.S. Cl. .............. 310/184; 310/179; 310/156.56; 310/156.57; 310/156.53
(58) Field of Search .................. 310/184, 179, 310/156.01, 156.33, 156.38, 156.43, 156.44, 156.45, 156.48, 156.56, 156.57

(56) References Cited

U.S. PATENT DOCUMENTS

| 4,358,696 | A | | 11/1982 | Liu et al. ................... 310/156 |
| 4,924,130 | A | | 5/1990 | Fratta ......................... 310/261 |
| 5,097,166 | A | | 3/1992 | Mikulic ...................... 310/156 |
| 5,510,662 | A | | 4/1996 | Tanimoto et al. ........... 310/156 |
| 5,672,926 | A | | 9/1997 | Brandes et al. ............ 310/181 |
| 5,811,904 | A | * | 9/1998 | Tajima et al. .......... 310/156.45 |
| 6,034,459 | A | * | 3/2000 | Matsunobu et al. ... 310/156.38 |
| 6,239,525 | B1 | * | 5/2001 | Matsunobu et al. ... 310/156.38 |

FOREIGN PATENT DOCUMENTS

| JP | 5-76146 | 3/1993 |
| JP | 05-304743 | 11/1993 |
| JP | 06-156064 | 6/1994 |
| JP | 08-331823 | 12/1996 |
| JP | 08-331883 | 12/1996 |

(List continued on next page.)

OTHER PUBLICATIONS

Copy of Korean Patent Office Communication for corresponding Korean Patent Application No. 519980960948 dated Nov. 27, 2003 including Japanese and English translations of relevant portions.

*Primary Examiner*—Thanh Lam
(74) *Attorney, Agent, or Firm*—Armstrong, Kratz, Quintos, Hanson & Brooks, LLP

(57) ABSTRACT

A brushless motor capable of increasing energy density by effective utilization of reluctance torque. The brushless motor comprises a stator (5) and a rotor (1) having a lateral surface opposed to the stator (5). The stator (5) comprises a plurality of radially extending iron cores (10) and a plurality of windings (11) for generating a magnetic field in each iron core (10). The rotor (1) comprises a plurality of permanent magnets (2) and a magnetic field line inducing body disposed between each permanent magnet (2) and the lateral surface.

13 Claims, 16 Drawing Sheets

FOREIGN PATENT DOCUMENTS

| | | |
|---|---|---|
| JP | 09-191683 | 7/1997 |
| JP | 10-23724 | 1/1998 |
| JP | H10-23724 | 1/1998 |
| JP | 10-126985 | 5/1998 |
| JP | H10-126985 | 5/1998 |
| JP | 5236687 | 9/1998 |
| JP | 10-262359 | 9/1998 |
| JP | H10-262359 | 9/1998 |
| JP | 11-27879 | 1/1999 |
| JP | 11-89133 | 3/1999 |
| JP | 11-89134 | 3/1999 |
| JP | 11-89135 | 3/1999 |
| JP | 11-89136 | 3/1999 |
| JP | 11-89137 | 3/1999 |
| JP | 11-89145 | 3/1999 |
| JP | 11-98791 | 4/1999 |
| JP | 11-136892 | 5/1999 |
| JP | 11-196544 | 7/1999 |
| JP | 11-206049 | 7/1999 |
| JP | 11-243653 | 9/1999 |
| JP | 11-285185 | 10/1999 |
| JP | 11-285186 | 10/1999 |
| JP | 11-346497 | 12/1999 |
| JP | 2000-69788 | 3/2000 |
| JP | 2000-78784 | 3/2000 |
| JP | 2000-069784 | 3/2000 |
| JP | 2000-125489 | 4/2000 |
| JP | 2000-125490 | 4/2000 |
| JP | 2000-134978 | 5/2000 |
| JP | 2000-152569 | 5/2000 |
| JP | 2000-152682 | 5/2000 |
| JP | 2000-152684 | 5/2000 |
| JP | 2000-175389 | 6/2000 |
| JP | 2000-197386 | 7/2000 |
| JP | 2000-217286 | 8/2000 |
| RU | 2022824 C1 | 10/1992 |
| RU | 94021358 A1 | 4/1994 |

* cited by examiner

BRUSHLESS MOTOR

BACKGROUND OF THE INVENTION

1. Field of the Invention

The present invention relates to a brushless motor. More particularly, the present invention relates to a brushless motor used as a driving source of an industry robot, a machine tool, an electric car or an electric train.

2. Description of the Related Art

In order to miniaturize a motor and to increase output power and torque thereof, it is important that an energy density Edc is high, which implies a ratio of the volume of the motor to the output power. Moreover, in order to simplify the structure of the motor, it is important to minimize the number of slots for winding arrangement and make a working efficiency of a winding operation higher.

Such a brushless motor is disclosed in Japanese Laid Open Patent Application (JP-A-Heisei, 11-98791). As shown in FIG. 1, the known brushless motor is a surface magnet type brushless DC motor including 14 poles and 12 slots. The brushless motor is provided with: a group of permanent magnets 102 placed on a cylindrical surface of a rotor 101 in which 14 poles are arranged in series; and a stator 104 in which 12 slots 103-1 to 103-12 are radially placed on the same circumference at a same angular interval. One set of windings 105-U1, 105-V1 and 105-W1 and another set of windings 105-U2, 105-V2 and 105-W2, which respectively positionally correspond to each other, are placed at positions in which phases are mutually shifted counter-clockwise by an electric angle of 120 degrees, in six pairs of slots, each of which is composed of two slots adjacent to each other, among 12 slots 103-1 to 103-12. Moreover, six windings 105-U1', 105-V1', 105-W1', 105-U2', 105-V2' and 105-W2' are respectively placed such that they are shifted by a rotational angle of 30 degrees with respect to the six windings 105-U1, 105-V1, 105-W1, 105-U2, 105-V2 and 105-W2. A U-phase voltage having a phase of 0 is provided for the winding 105-U1 and the windings 105-U2, 105-U1' and 105-U2'. A V-phase voltage having a phase delayed by about 120 degrees from that of the U-phase voltage is provided for the windings 105-V1, 105-V2, 105-V1' and 105-V2'. A W-phase voltage having a phase delayed by about 120 degrees from that of the V-phase voltage is provided for the windings 105-W1, 105-W2, 105-W1' and 105-W2'.

An output torque T of the known brushless motor is given by the following equation:

$$T=p\{\phi \cdot I_a \cdot \cos(\beta)+(L_q-L_d)I_a^2 \cdot \sin(2\beta)/2\}. \quad (1)$$

Here, p: Number of Pole Pairs (Number of Poles/2)
$\phi$: Maximum armature flux linkage of the permanent magnet
$I_a$: Armature current
$\beta$: Phase of armature current
$L_d$: Direct-axis inductance (Inductance in the d-axis direction)
$L_q$: Quadrature-axis inductance (Inductance in the q-axis Direction)

The phase of the armature current is defined under the assumption that the phase of the U-phase voltage is 0. The first term on the right side of the equation (1) represents a magnet torque, and the second term on the right side represents a reluctance torque.

In the above-mentioned surface magnet type brushless motor, in which the permanent magnet is placed on the surface of an iron core 101, the following equation:

$$L_q \approx L_d, \quad (2)$$

can be established from the property of that structure. Here, the symbol "$\approx$" indicates that the $L_q$ is approximately (substantially or nearly) equal to the $L_d$.

Thus, the output torque of the surface magnet type brushless motor is substantially given by the following equation:

$$T=p\{\phi \cdot I_a \cdot \cos(\beta)\}.$$

Accordingly, the output component represented by the second term on the right side of the previous equation is 0. That component is not outputted. The surface magnet type brushless motor can effectively use only the magnet torque indicated by the first term on the right side of the equation (1). Hence, the increase in the energy density is suppressed.

It is desirable to increase the energy density by effectively using the reluctance torque indicated by the second term on the right side of the equation (1).

SUMMARY OF THE INVENTION

Therefore, an object of the present invention is to provide a brushless motor in which the energy density is increased by effectively using the reluctance torque.

Another object of the present invention is to suppress a torque ripple of the brushless motor.

Still another object of the present invention is to reduce an armature current of the brushless motor.

Still another object of the present invention is to decrease a supply voltage to be provided for the brushless motor.

Still another object of the present invention is to miniaturize the brushless motor.

In order to attain the objects of the present invention, the brushless motor includes a stator and a rotor having a lateral surface opposed to the stator. The stator has a plurality of radially extending iron cores and a plurality of windings for generating magnet fields in the respective iron cores. The rotor includes a plurality of permanent magnets and magnet force line inducing bodies located between the permanent magnets and the lateral surface.

Here, it is desirable that an output torque T is given by the following equation:

$$T=p\{\phi \cdot I_a \cdot \cos(\beta)+(L_q-L_d)I_a^2 \cdot \sin(2\beta)/2\},$$

where p: Number of Pole Pairs (Number of Poles/2)
$\phi$: Maximum armature flux linkage of the permanent magnet
$I_a$: Armature current
$\beta$: Phase of armature current
$L_d$: Direct-axis inductance (Inductance in the d-axis direction)
$L_q$: Quadrature-axis inductance (Inductance in the q-axis Direction)

while the following equation:

$$L_q \approx L_d,$$

does not hold.

Also, it is preferable that the rotor has holes into which the permanent magnets are inserted in the axis direction of the rotor.

Preferably, three-phase direct current is provided for the windings.

Preferably, the windings include a first set of windings and a second set of windings, and the first set of three-phase windings and the second set of three-phase windings are arranged to be symmetrical with respect to a line.

Also, it is preferable that the windings include a first group of three-phase windings and a second group of three-phase windings, windings having the same phase of the first and second groups of three-phase windings are adjacent to each other in the same rotation direction, the first group of three-phase windings include a first set of three-phase windings and a second set of three-phase windings, the first set of three-phase windings and the second set of three-phase windings are arranged to be approximately geometrically symmetrical with respect to a line, the second group of three-phase windings include another first set of three-phase windings and another second set three-phase windings, and the other first set three-phase windings and the other second set of three-phase windings are arranged to be approximately geometrically symmetrical with respect to a line.

It is preferable that the number of the windings is N, the number of the permanent magnets is P, and that P is greater than the N.

In this case, it is preferable that one of prime factors of the P is greater than any of prime factors of the N.

It is also preferable that the prime factor of N is 2 and 3, and the prime factor of P is 2 and 7.

Also, P preferably satisfies the following equation:

$$12 \leq P \leq 30,$$

Preferably, N is 12, and P is 14.

Preferably, a section of the permanent magnet in a flat plane vertical to a central axis of the rotor is rectangular, the rectangle has short sides and long sides longer than the short sides, and the long sides are opposed to the lateral surface.

Preferably, the permanent magnet has a shape of a substantially rectangular parallelepiped, and a distance d between a center of the rotor and a magnetic pole surface opposed to the lateral surface among surfaces of the permanent magnets satisfies the following equation:

$$d \geq r - D/10,$$

Here, $$D = 2\pi r/P,$$

r: Radius of the rotor, and
P: Number of the permanent magnets.
Also, the following equation $$0 \leq (L_q - L_d)/L_d \leq 0.3,$$

preferably holds, where $L_q$: Quadrature-axis inductance of the rotor, and
$L_d$: Direct-axis inductance of the rotor.

Moreover, it is preferable that the magnetic force line inducting bodies include a direct axis magnetic force line inducting body for inducing magnetic fluxes in the direct axis direction of the rotor, the magnetic force line inducting bodies having a gap extending in the quadrature axis direction of the rotor.

DETAILED DESCRIPTION OF THE PREFERRED EMBODIMENTS

First Embodiment

Figure 1:
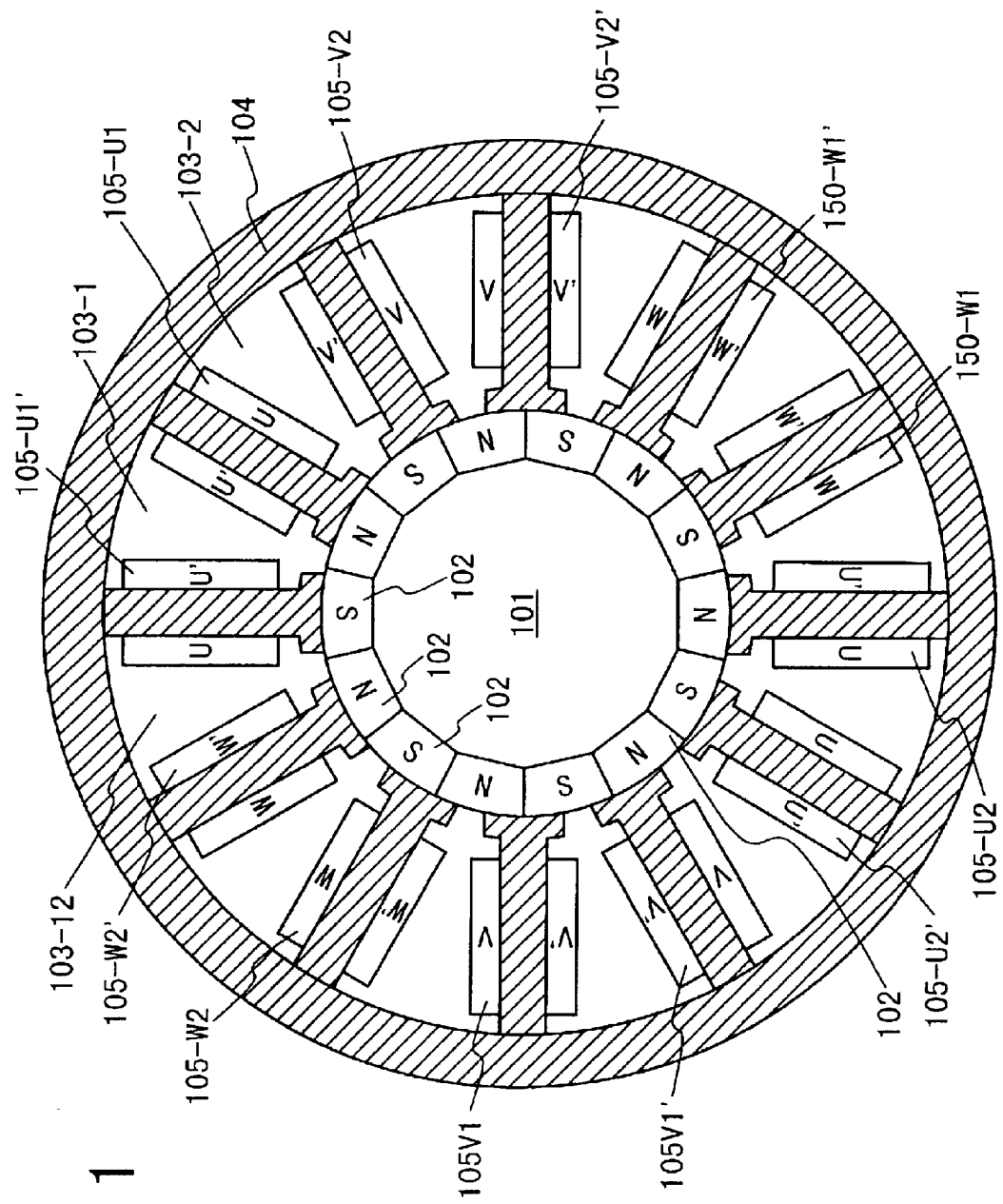
FIG. 1 shows a brushless motor in a first embodiment according to the present invention.

A brushless motor in the first embodiment is a brushless DC motor driven by a three-phase pulse direct current. The brushless motor has a rotor 1 shown in FIG. 2. The rotor 1 is constituted by a magnetic force line inducing material for inducing a magnetic force line, such as silicon steel or electro-magnetic steel. A 14-pole permanent magnet 2 is embedded in the rotor 1. The 14-pole permanent magnet 2 corresponds to 14 permanent magnets. The 14 permanent magnets 2 are inserted and placed in 14 pillar holes 4 opened through the rotor 1 in an axis direction. The pillar holes 4 are trapezoidal on a section orthogonal to the axis. One rectangular bar magnet is pressed to be place in each of the pillar holes 4. A magnetic force line, which is oriented from a South pole to a North pole in each of the permanent magnets 2, is oriented in the axis direction. The directions of the magnetic force lines generated by the two magnets adjacent to each other are opposite to each other. The 14 permanent magnets 2 are arrayed at the same angle interval (=360°/14) on the same circumference. The magnetic force lines, generated by the 14 magnets arrayed in the circumference direction as mentioned above, are generated by the synthesis of the magnetic force line oriented in the circumference direction and the magnetic force line oriented in the axis direction.

The rotor 1 has a stator 5 having the structure of a bearing. The stator 5 includes a cylindrical ring iron core 8, iron cores $10_1$–$10_{12}$ extending in a radius direction from the ring iron core 8, and windings $11_1$–$11_{12}$. Hereafter, the iron cores $10_1$–$10_{12}$ may be collectively referred to as iron cores 10, and the windings $11_1$–$11_{12}$ may be collectively referred to as windings 11. The ring iron core 8 and the iron cores 10 are integrally formed into one unit. There is micro clearance between a cylindrical surface, which is an outer circumference surface of the rotor 1 and an inner surface of the iron core 10 in the radius direction. The iron cores 10 are placed on the same circumference at a same interval (=360°/12). A center of the ring iron core 8 is coincident with a center of the rotor 1. Twelve slots $9_1$–$9_{12}$ are respectively formed between the two iron cores adjacent to each other among the iron cores 10.

The windings $11_1$–$11_{12}$ are respectively wounded around the iron cores $10_1$–$10_{12}$. The three windings $11_1$, $11_5$, and $11_{99}$ of the 12 windings 11 constitute a first set of windings. The three windings, constituting the first set of windings, are placed on the same circumference at the same interval (=120°=°360°/3). Other three windings $11_7$, $11_{11}$, and $11_3$ of the twelve windings 11 are placed respectively positionally corresponding to the first set windings $11_1$, $11_5$, and $11_{99}$ with respect to a line, and they constitute a second set of windings. Here, a center of the line symmetry corresponds to a rotational axis centerline of the rotor 1.

The first set winding and the second set winding constitute a first group of windings. The six windings constituting a second group winding are placed respectively adjacently in the same rotation direction in the six windings of the first group winding.

Figure 2:
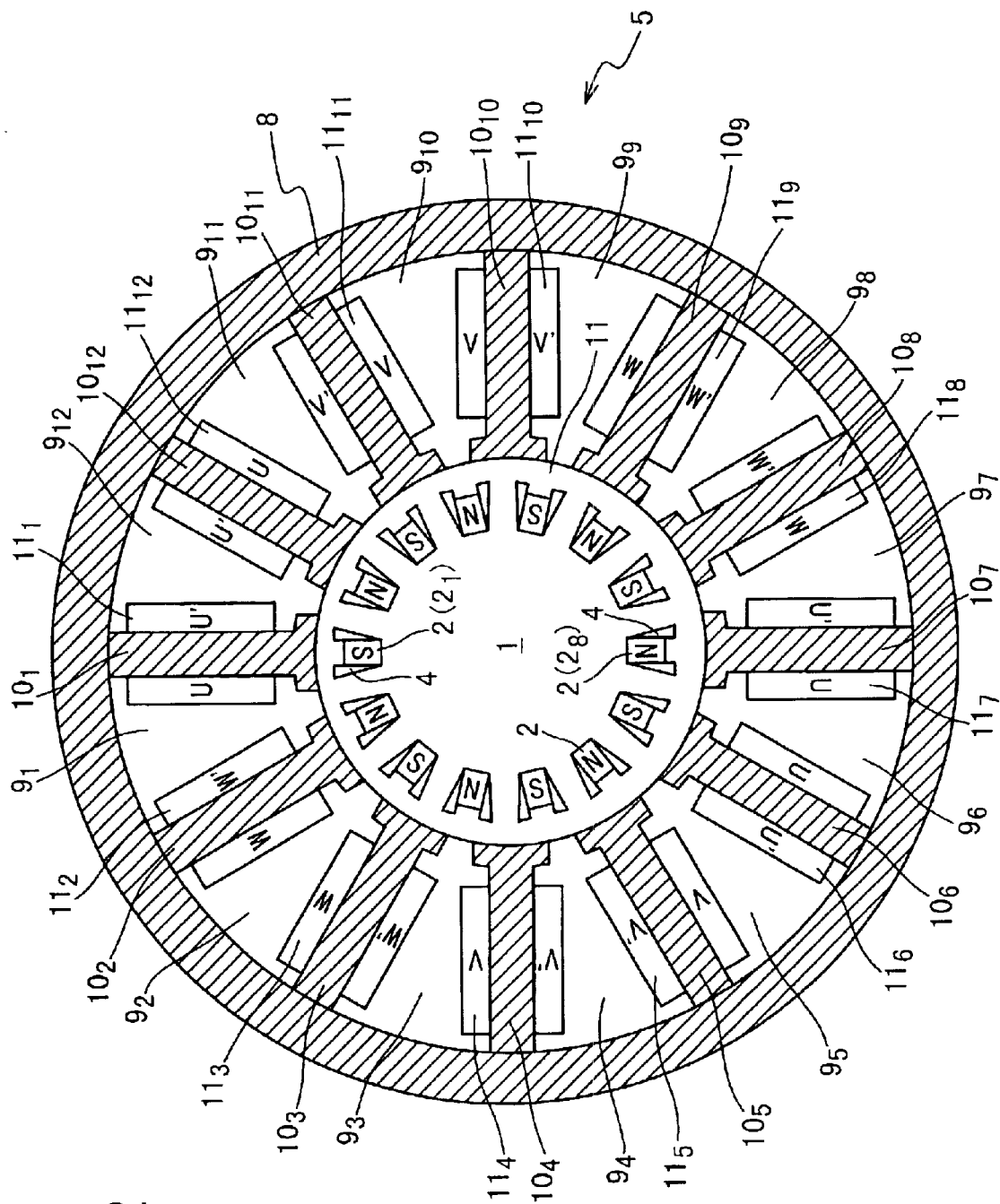
FIG. 2 shows a configuration of the brushless motor in the first embodiment according to the present invention.

Phases of armature currents provided for the windings $11_1$–$11_{12}$ are denoted by symbols U, V, W, U', V' and W' shown in FIG. 2. A U-phase armature current is provided for the windings $11_1$, $11_6$, $11_7$, and $11_{12}$, a V-phase armature current provided for the windings $11_4$, $11_5$, $11_{10}$, and $11_{11}$, and a W-phase armature current is provided for the windings $11_2$, $11_3$, $11_8$, and $11_9$. The U-phase armature current, the V-phase armature current and the W-phase armature current are pulse direct currents whose phases are shifted by about 120° from each other. The temporal intervals of the U-phase, V-phase and W-phase armature currents are controlled, namely, the magnetic field rotation speed is controlled so that the rotor 1 is rotated at any rotationally angular speed.

Also, the directions in which the currents flow through the windings $11_1$–$11_{12}$ are denoted by symbols U, V, W, U', V' and W' in FIG. 2. The directions of the currents denoted by the symbols U, V and W are opposite to the directions of the currents denoted by the symbols U', V' and W', respectively. The currents in the directions opposite to each other when they are viewed from on the same circumference direction line flow through the two windings located symmetrically with respect to the line. For example, the currents in the directions opposite to each other flow through the winding $11_1$ and the winding $11_7$. The polarities of the two permanent magnets 2 placed positionally corresponding to a certain rotation angle position, in the two windings having the above-mentioned configuration are opposite to each other. For example, although a South pole of a permanent magnet $2_1$ is oriented in the rotor 1, a North pole of the permanent magnet $2_8$ is oriented in the rotor 1. The armature currents in the directions opposite to each other simultaneously flow through the respective windings of the first group winding and the respective windings of the second group winding which have the same phase and are adjacent to the above-mentioned respective windings. For example, the armature currents in the directions opposite to each other flow through the winding $11_1$ and the winding $11_{12}$.

In the brushless motor according to the present invention, the fact that an output torque is larger than that of the known brushless motor is introduced from the equation (1). The equation (1) is as follows:

$$T=p(T_M+T_R)$$

$$T_M=\phi \cdot I_a \cdot \cos(\beta),$$

$$T_R=(L_q-L_d)I_a^2 \cdot \sin(2\beta)/2$$

where $T_M$ is the magnet torque, and $T_R$ is the reluctance torque.

The 14 permanent magnets $2_1$–$2_{14}$ are embedded in the rotor 1 and thus the density of magnetic force lines closed by a magnetic route in the rotor 1 is higher than that of the known motor in FIG. 1. Such a difference causes the values of and to be further targetless, which results in the positive establishment of the following equation:

$$L_q>L_d, \tag{4}$$

Let us compare the known brushless motor with the brushless motor according to the present invention. When the output torque of the known brushless motor is represented by T' and the output torque of the brushless motor according to the present invention is represented by T, the following equation:

$$T'<T, \tag{5}$$

is established from the condition (4).

Figure 3:
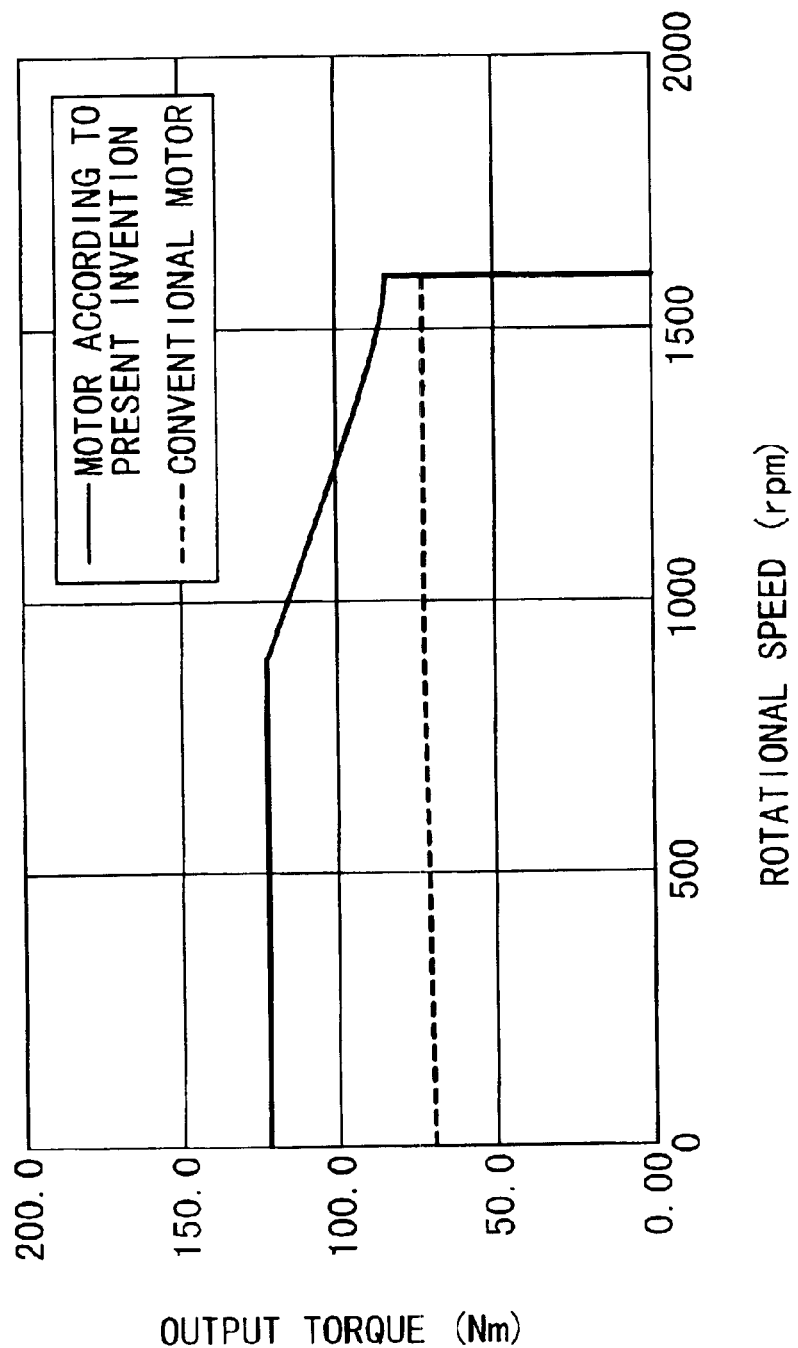
FIG. 3 is a graph showing a performance comparison of a brushless motor.
Figure 4:
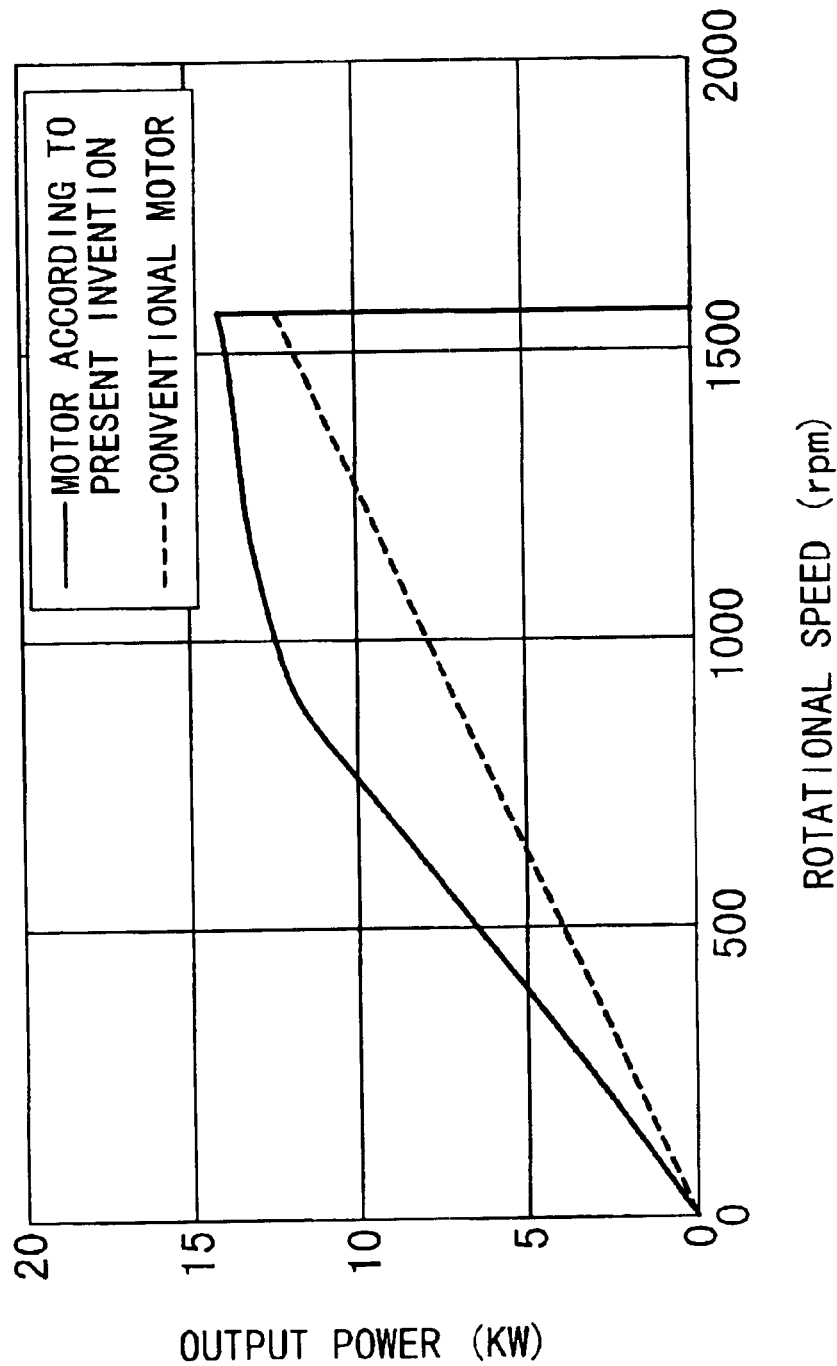
FIG. 4 is another graph showing a performance comparison of a brushless motor.

FIGS. 3, 4 show the performances comparison between the known brushless motor and the brushless motor according to the present invention. FIG. 3 shows the performance comparison with regard to the relation between the rotation speed and the output torque, and FIG. 4 shows the performance comparison with regard to the relation between the rotation speed and the output. In the brushless motor according to the present invention, both the output torque (its unit is Nm) and the output (its unit is J in terms of kW) are greater than those of the known brushless motor.

Moreover, the brushless motor according to the present invention succeeds to the following merits of the known brushless motor in their original states.
(1) The brushless motor has a high winding coefficient and a high energy density.
(2) The number of slots is reduced, and the productivity efficiency is high.
(3) A cogging torque generation index, namely, the least common multiple of the pole number 14 and the slot number 12 is large, and a torque ripple frequency is increased.

The high torque ripple frequency is effective since it minimizes the influence on a mechanical system, which is usually controlled at a low frequency band.

Moreover, the inner installation of the permanent magnet stimulates the structure of the protruded pole in the magnetic force system so that the $L_q$ is not equal to the $L_d$. Thus, the reluctance torque is effectively used, which leads to the higher energy density, namely, the higher output. Conversely, the miniaturization is possible.

Second Embodiment

Figure 5:
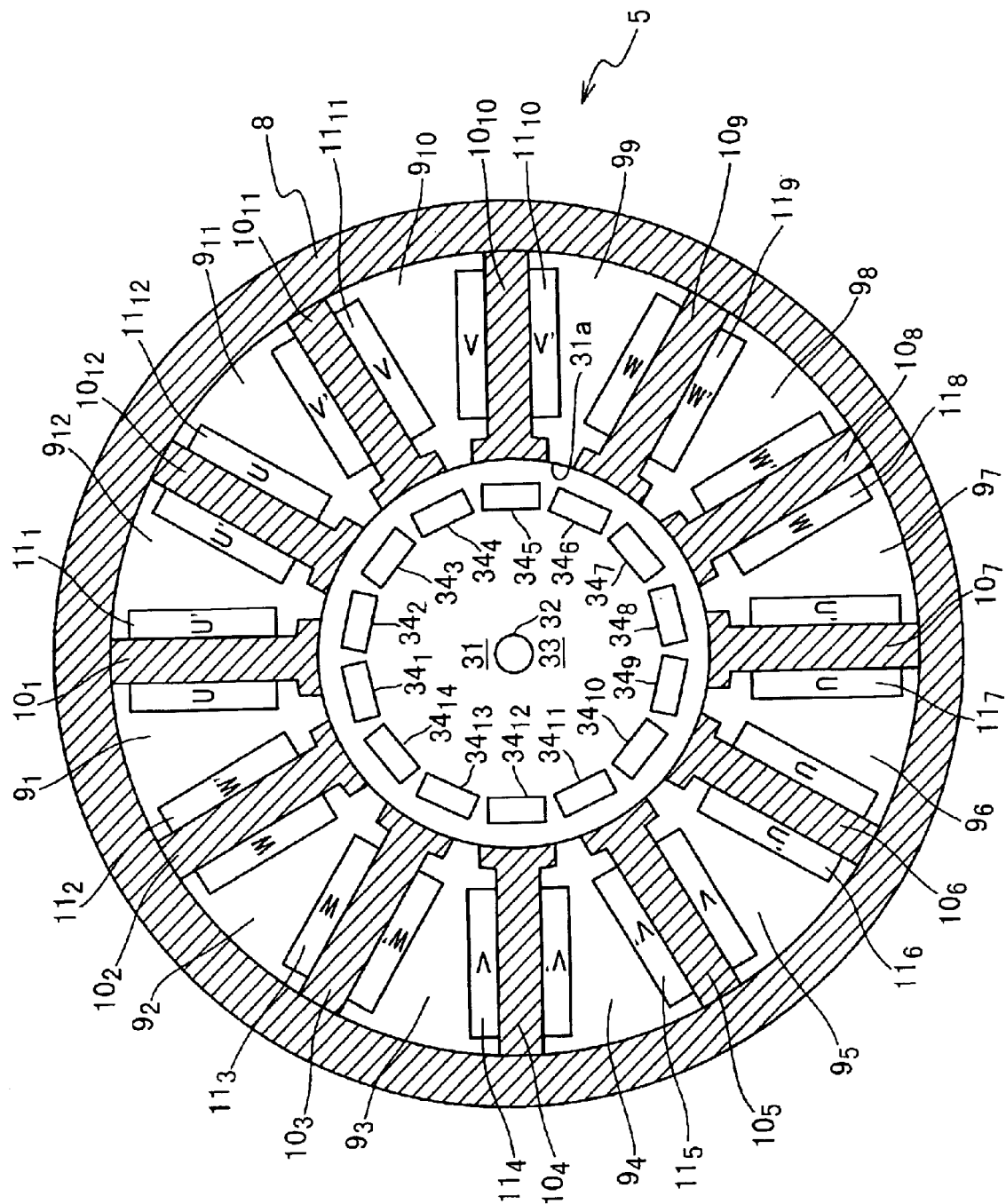
FIG. 5 shows a configuration of a brushless motor in a second embodiment according to the present invention.

A brushless motor in the second embodiment is a brushless DC motor having the structure similar to that of the brushless motor in the first embodiment. The brushless motor in the second embodiment differs from the brushless motor in the first embodiment in the structure of the rotor. The brushless motor in the second embodiment includes a stator 5 and a rotor 31 as shown in FIG. 5. The structure of the stator 5 is equal to that explained in the first embodiment.

The rotor 31 is opposed to the stator 5 on a rotor side surface 31a. The rotor 31 is rotatably connected to a shaft 32. The rotor 31 is rotated on the shaft 32.

The rotor 31 includes a rotor iron core 33 and 14 permanent magnets $34_1$–$34_{14}$ as shown in FIG. 2. The permanent magnets $34_1$–$34_{14}$ are collectively referred to as permanent magnets 34.

The rotor iron core 33 is formed of laminated silicon steel plates. The respective silicon steel plates are electrically insulated from each other. This reduces the loss by eddy currents. Each of the silicon steel plates is blanked out and provided with holes into which permanent magnets 34 are embedded. The permanent magnets 34 are inserted into the holes. That is, the permanent magnets 34 are embedded in the rotor iron core 33. By the way, the rotor iron core 33 may be made of another material such as electromagnetic steel plates.

Figure 6:
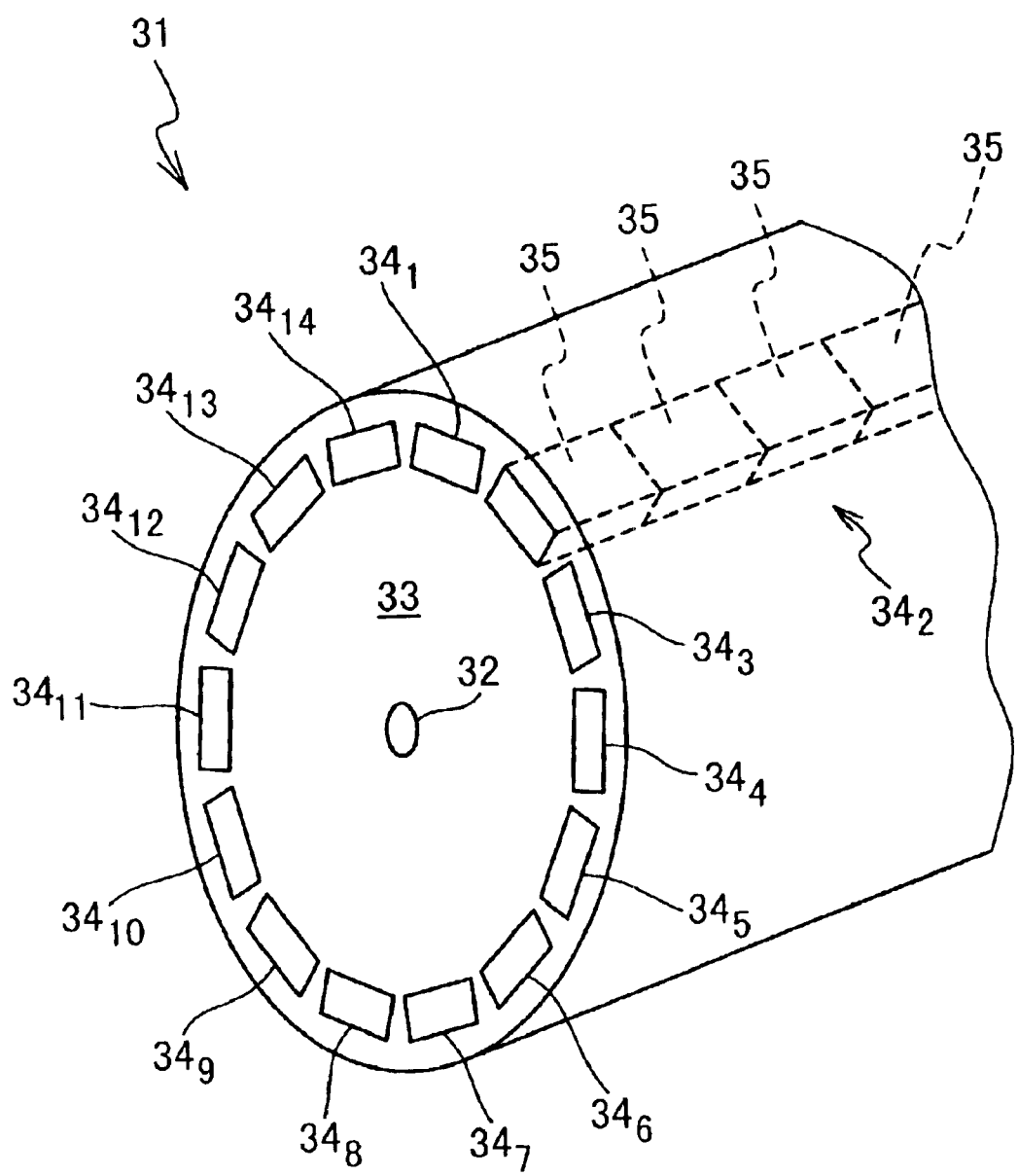
FIG. 6 shows a configuration of a rotor 31.

FIG. 6 shows the structure in the axis direction of the rotor 31. FIG. 6 shows the structure of the permanent magnet $34_2$ among the permanent magnets 34. The other permanent magnets 34 have the same structure as the permanent magnet $34_2$. Each of the permanent magnets 34 is composed of a plurality of magnets 35 connected in the axis direction of the rotor 31, as shown in FIG. 6. The magnets 35 are electrically insulated from each other. Thus, the loss caused by the eddy currents is suppressed.

The permanent magnets 34 substantially have the shape of a rectangular parallelepiped. The permanent magnets 34 having the shape of the rectangular parallelepiped are advantageous in that the permanent magnets 34 are easily produced. In the known brushless motor shown in FIG. 1, permanent magnets having curved surfaces are placed on a side of the rotor 101. The fabrication of permanent magnets having the curved surfaces increases the cost. In the brushless motor in this embodiment, on the other hand, the permanent magnets 34 have the shape of the rectangular parallelepiped, and thus the cost is reduced.

The North poles of the permanent magnets $34_1$, $34_3$, $34_5$, $34_7$, $34_9$, $34_{11}$, and $34_{13}$ among the permanent magnets 34 are located on the outer side of the rotor 31 in the radius direction, and their South poles are located on the inner side of the rotor 31. On the other hand, the South poles of the permanent magnets $34_2$, $34_4$, $34_6$, $34_8$, $34_{10}$, $34_{12}$, and $34_{13}$ among the permanent magnets 34 are located on the outer side in the radius direction of the rotor 31, and their North poles are located on the inner side in the radius direction of the rotor 31. That is, the two permanent magnets adjacent to each other among the permanent magnets 34 generate the magnetic force lines in the directions opposite to each other.

Figure 7:
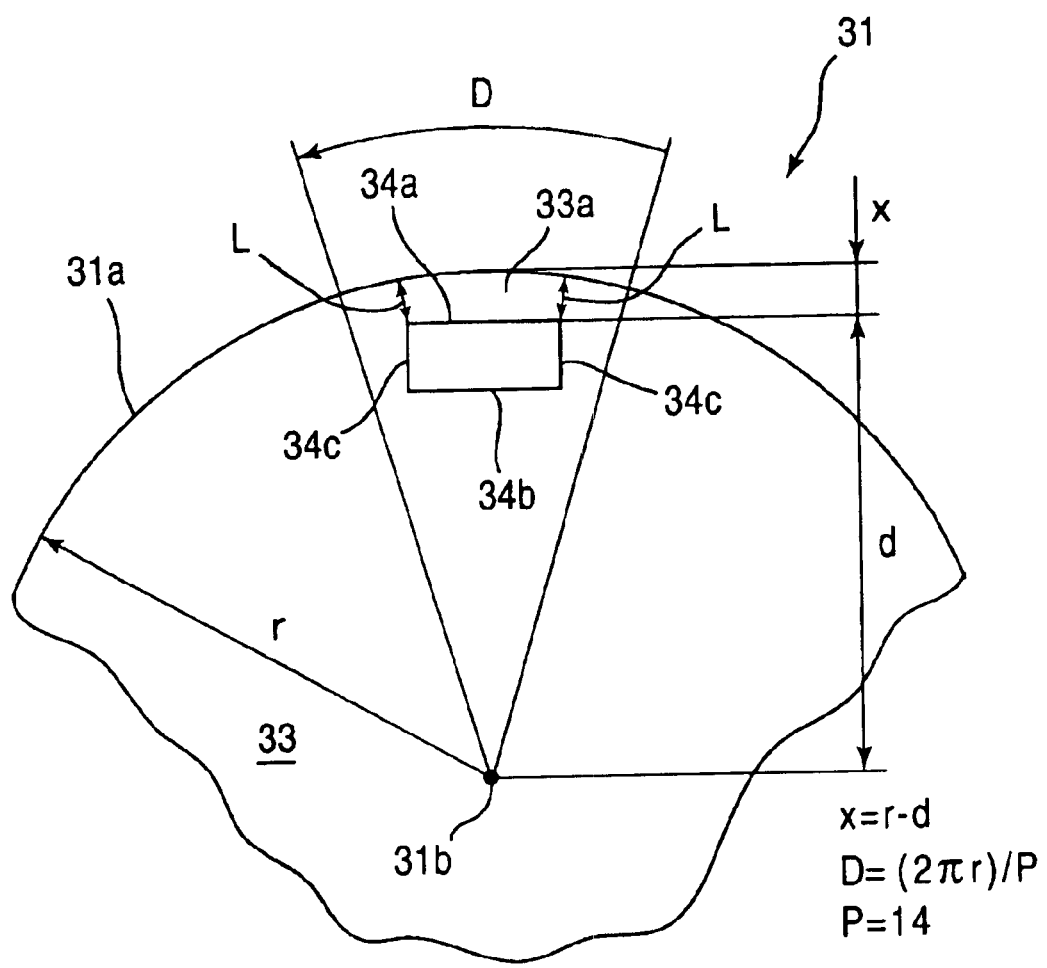
FIG. 7 is an expanded view showing a part of the rotor 31.

FIG. 7 is an expanded view showing a part of the rotor 31. The permanent magnet 34 has an opposing surface 34a opposed to a rotor side surface 31a of the rotor 31 and an opposing surface 34b opposed to a center 11b of the rotor 31. The two magnetic poles of the permanent magnets 34 are located on the opposing surfaces 34a, and 34b. The opposing surfaces 34a and 34b forms the long sides of a rectangle formed on a section of the permanent magnet 34 located in a direction vertical to a central axis of the rotor 31.

The permanent magnets 34 are placed in the vicinity of the rotor side surface 31a. The rotor side surface 31a and the permanent magnets 34 are located the closest to each other at end portions 34c. That is, when an embedded amount of the permanent magnet 34 is assumed to be x and a distance between the rotor side surface 31a and the end portions 34c is assumed to be L, the following equation:

$$x > L, $$

holds. Here, the embedded amount x is defined as the difference between a radius r of the rotor 31 and a distance d to the center 11b of the rotor 31 from the opposing surface 34a, which is the plane opposed to the rotor side surface 31a among the surfaces of the permanent magnets 34. Then, the embedded amount x is given by:

$$x = r - d. \tag{6}$$

Since the rotor 31 has the above-mentioned structure, the magnetic flux generated by the permanent magnets 34 is more effectively used for the generation of the magnet torque. The rotor side surface 31a and the permanent magnets 34 are located the closest to each other at the end portions 34c, and this reduces the magnetic force lines passing between the rotor side surface 31a and the end 34c among the magnetic force lines generated by the permanent magnets 34. Thus, the stronger magnet torque is generated. In this way, the brushless motor in this embodiment can obtain the strong magnet torque in the same way as the known brushless motor.

From the viewpoint of the generation of the magnet torque, the distance L between the rotor side surface 31a and the end portion 34c is desired to be narrow. The narrower the distance between the rotor side surface 31a and the end portion 34c, the smaller the number of the magnetic force lines passing between the rotor side surface 31a and the end portion 34c among the magnetic force lines generated by the permanent magnets 34. The distance between the rotor side surface 31a and the end portion 34c is desired to be selected such that substantially all of the magnetic force lines generated by the permanent magnets 34 pass through the rotor side surface 31a.

On the other hand, a narrow distance between the rotor side surface 31a and the end portions 34c weakens the mechanical strength for the rotor iron core 33 to retain the permanent magnet 34. If the mechanical strength is excessively weak, the rotor iron core 33 is damaged to thereby detach the permanent magnet 34 from the rotor 31 while the rotor 31 is rotated. The distance between the rotor side surface 31a and the end portions 34c is desirable to be selected as the minimum distance while keeping the mechanical strength at which the permanent magnet 34 is not detached while the rotor 31 is rotated. According to the experiment of the inventor, it is validated that the distance between the rotor side surface 31a and the end portion 34c can be selected so as to pass at least 95% of the magnetic force lines generated by the magnetic pole on the opposing surface 34a through the rotor side surface 31a while keeping the necessary mechanical strength.

The permanent magnets 34 does not face on the rotor side surface 31a, while the permanent magnets 34 are placed in the vicinity of the rotor side surface 31a. The permanent magnet 34 is embedded in the rotor iron core 33. That is, the rotor iron core 33 contains a magnetic force line inducing body 33a located between the permanent magnets 34 and the rotor side surface 31a.

The existence of the magnetic force line inducing body 33a contributes to a drop in an input voltage V of the brushless motor in this embodiment. The input voltage V is given by:

$$V = \sqrt{6} \cdot \{(RI_d + \omega L_q I_q)^2 + (RI_q - \omega L_d I_d + V_c)^2\}^{1/2}, \tag{7}$$

where

R: Resistance of the armature $\omega$: Angular frequency of the rotor rotation $I_d$: d-axis component of the armature current $I_a$ ($I_d = I_a \sin(\beta)$.)

$I_q$: q-axis component of the armature current $I_a$ ($I_q = I_a \cos(\beta)$.)

$V_c$: Induced voltage in the armature coil by the rotation of the rotor.

The existence of the magnetic force line inducing body 33a causes a field weakening on the rotor 31. Moreover, the existence of the magnetic force line inducing body 33a leads to the increase in an inductance $L_d$ in a direct axis direction. Accordingly, $(-\omega L_d I_d + V_c)$ approaches 0. As is understood from the equation (7), as the $(-\omega L_d I_d + V_c)$ is close to 0, the input voltage V becomes lower. In this way, the existence of the magnetic force line inducing body 33a results in the drop in the input voltage V of the brushless motor.

The existence of the magnetic force line inducing body 33a simultaneously contributes to the generation of the reluctance torque. That is, the brushless motor uses the magnet torque similar to that of the known brushless motor, and further uses the reluctance torque. The brushless motor in this embodiment can obtain the high torque, since the magnet torque is used at the high efficiency, and additionally the reluctance torque is used.

However, differently from the known brushless motor, the ratio occupied by the reluctance torque is low in the torque generated by the brushless motor in this embodiment. This is because the permanent magnets 34 are placed in the vicinity of the rotor side surface 31a and the volume of the magnetic force line inducing body 33a is small. The main torque generated by the brushless motor in this embodiment is the magnet torque. Since the generated torque is mainly the magnet torque, the torque ripple is low in the brushless motor in this embodiment.

In the brushless motor in this embodiment, the number of the permanent magnets 34, namely, the pole number P has a large influence on the property of the brushless motor in this embodiment. In the brushless motor in this embodiment, the number of the permanent magnets 34 is determined as described below so that the property is improved. The number of the permanent magnets 34 may be referred to as the pole number P.

First, the number of the permanent magnets 34 is determined to be greater than the number of the slots 9. In other words, the number of the permanent magnets 34 is determined to be greater than the number of the iron cores 10 and the number of the windings 11 since the number of the slots 9 is equal to the number of the iron cores 10 and the number of the windings 11. Thus, the magnetic circuit is uniformed to thereby suppress the torque ripple.

Moreover, the number of the permanent magnets 34 is selected from the range between 12 and 30. The validity of selecting the number of the permanent magnets 34 from the range between 12 and 30 is discussed in the following.

Figure 8A:
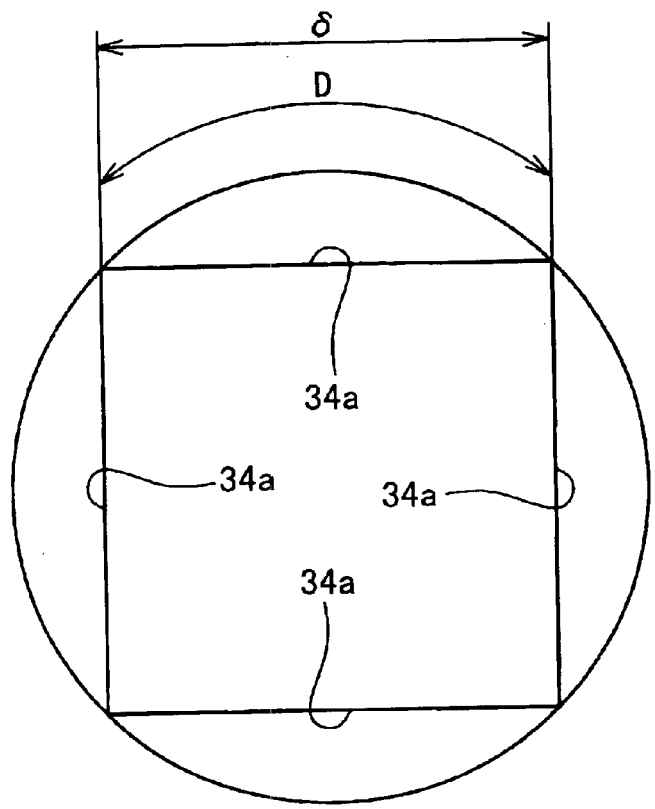
FIG. 8A is a view explaining an effective magnet area rate Mgc.

At first, let us suppose that a thickness of the permanent magnets 34 is virtually 0 as shown in FIG. 8A. Here, the reason why the thickness of the permanent magnets 34 is virtually 0 is to consider the ideal case in which the permanent magnets 34 can be placed in the densest condition. The opposing surface 34a opposed to the rotor side surface 31a among the surfaces of the permanent magnets 34 constitutes an inscribed polygon of the rotor 31 on the section of the rotor 31.

Let us define the effective magnet area rate Mgc as a ratio of a sum of areas of opposing surfaces 34a of the permanent magnets 34 to an area of the rotor side surface 31a. Then, the effective magnet area rate Mgc is represented by:

$$Mgc = \delta/D * 100(\%).$$

Here, $$D = 2\pi r/P,$$

r: the radius of rotor 31, and

P: Pole Number (Number of Permanent Magnets).

Also, δ implies a width of the opposing surface 34a of the permanent magnets 34 in a circumference direction of the rotor 31. The fact that the effective magnet area rate Mgc is close to 100(%) implies that a larger number of magnetic force lines generated by the permanent magnets 34 come in inter-linkage with the windings $11_1$–$11_{12}$.

Figure 9:
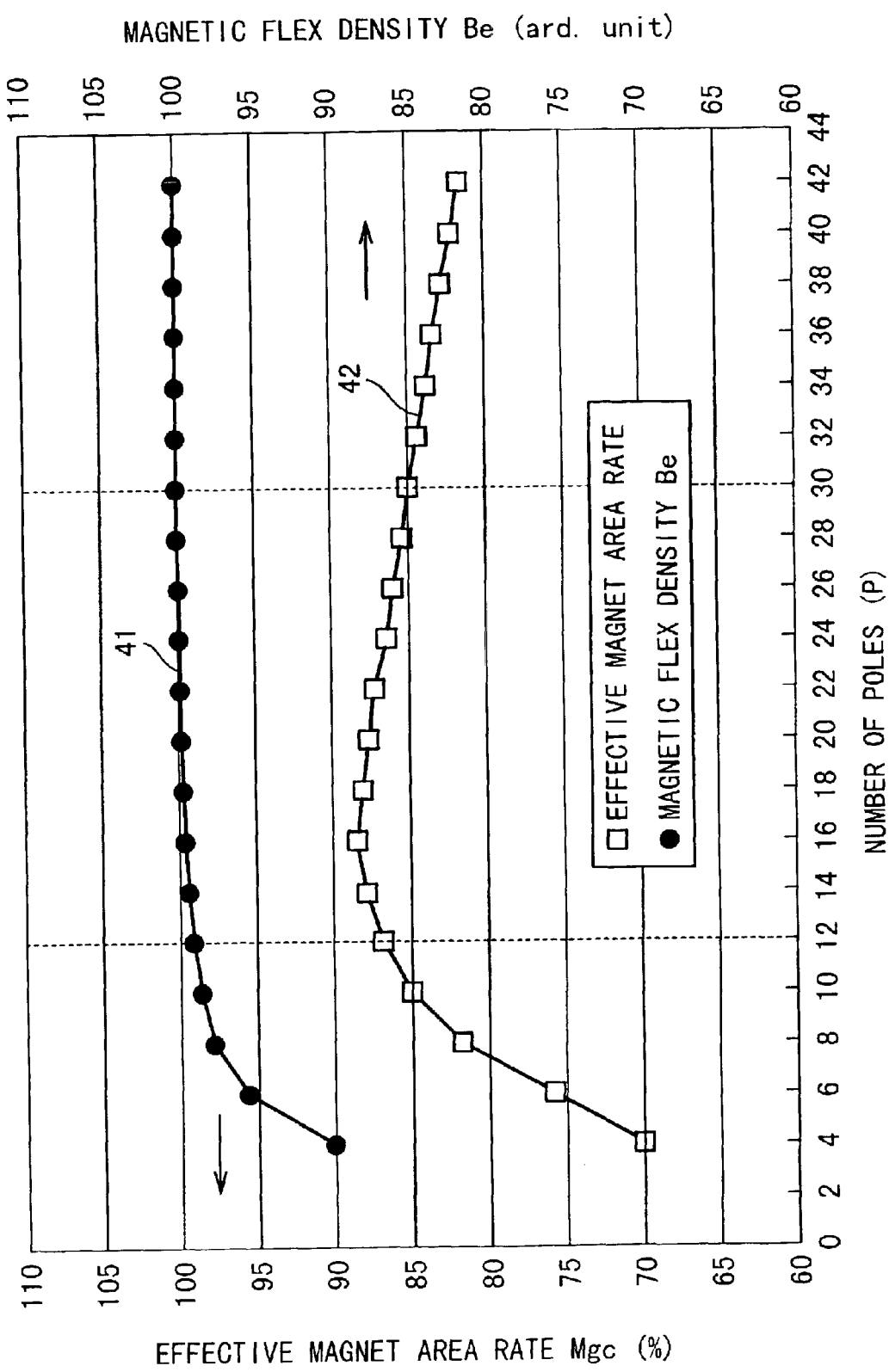
FIG. 9 shows a dependency of an effective magnet area rate Mgc and a magnetic flux density $B_e$ on a pole number P.

A curved line 41 of FIG. 9 indicates the dependency of the effective magnet area rate Mgc on the pole number P. As shown in FIG. 9, the greater the pole number P, the higher the effective magnet area rate Mgc. It is substantially saturated at the pole number P of 12. From this fact, it can be understood that a magnetic flux density B of the magnetic fluxes in inter-linkage with the windings $11_1$–$11_{12}$ can be substantially maximized by setting the pole number P to 12 or more when the thickness of the permanent magnet 34 is assumed to be virtually 0.

Figure 8B:
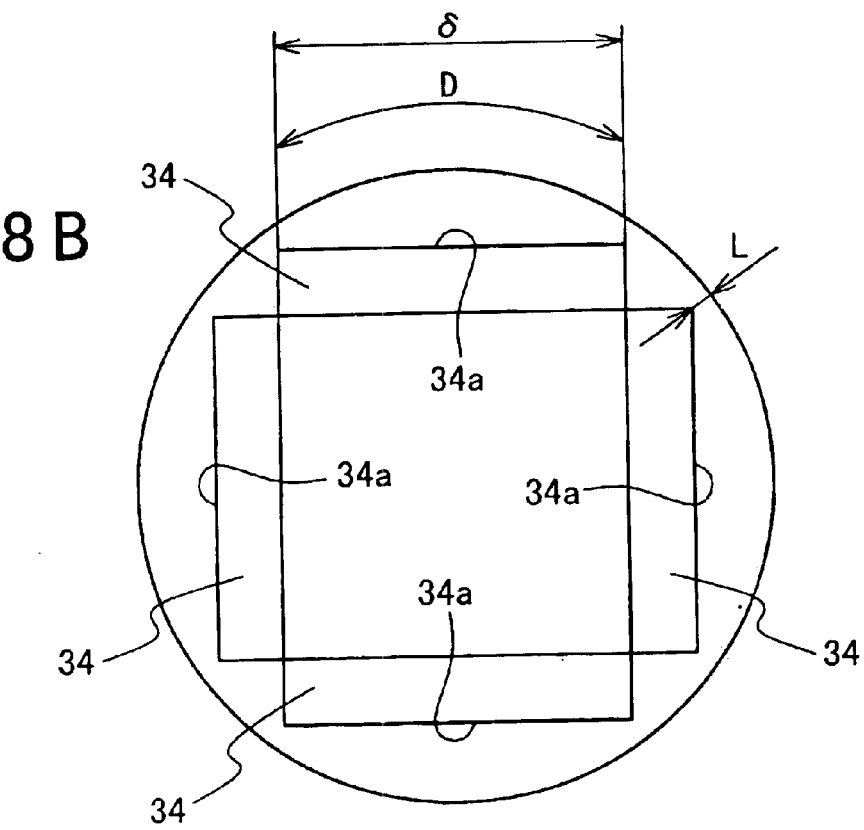
FIG. 8B is a view explaining an effective magnet area rate Mgc.

However, the infinitely thin permanent magnets 34 can not be actually considered. The thickness of the permanent magnets 34 is desired to be thin, however, the thickness of the permanent magnets 34 is limited by the mechanical strength, the coercive force of the permanent magnet 34 and other factors. Also, the permanent magnet 34 cannot be in contact with the rotor side surface 31a. As mentioned above, the distance L between the ends of the permanent magnets 34 and the rotor side surface 31a is desired to be short. However, in order to keep the mechanical strength, it is necessary that the distance L is longer than a certain value. Hereafter, let us consider the case in which the permanent magnet 34 has a certain thickness β and there is a certain distance L between the ends of the permanent magnets 34 and the rotor side surface 31a, as shown in FIG. 8B.

The width δ of the opposing surface 34a is decreased by the existence of the thickness β of the permanent magnets 34. The fact that the permanent magnets 34 have the thickness β implies the reduction in a magnetic force density $B_e$ of the magnetic fluxes passing through the rotor side surface 31a.

Also, the existence of the distance L to the rotor side surface 31a from the end portion of the permanent magnet 34 causes a magnetic circuit to be generated between the opposing surfaces 34a of the two permanent magnets 34 adjacent to each other. The magnetic resistance of the magnetic circuit is smaller as the distance between the two opposing surfaces 34a is shorter. Here, as the number of the permanent magnets 34 is greater, the distance between the two opposing surfaces 34a is shorter, which leads to the smaller magnetic resistance between them. This implies the increase in the magnetic fluxes that do not contribute to the torque generation since it is closed within the rotor 31, if the number of the permanent magnets 34 is greater.

Due to both the effects of the effective magnet area rate Mgc and the magnetic resistance between the two opposing surfaces 34a, the magnetic force density $B_e$ of the magnetic fluxes passing through the rotor side surface 31a provides the dependency in which it becomes maximum at a certain pole number P. A curved line 42 in FIG. 9 shows the dependency on the pole number P of the magnetic force density $B_e$ of the magnetic fluxes passing through the rotor side surface 31a, when the thickness β of the permanent magnet 34 and the distance L to the rotor side surface 31a from the end portions of the permanent magnets 34 are set to the values that the applicant considers as the minimum values which can be actually set on Nov. 8, 2000. Here, the magnetic force density $B_e$ is standardized such that the magnetic flux density of the magnetic fluxes passing through the rotor side surface 31a is 100 under assumption that the magnet faces on the entire rotor side.

As indicated by the curved line 42 of FIG. 9, in the range in which the pole number P is 12 or less, the magnetic force density $B_e$ of the magnetic fluxes passing through the rotor side surface 31a is sharply increased as the pole number P is greater. If the pole number P becomes greater than 12, the magnetic force density $B_e$ is almost saturated, and it has the maximum value when the pole number P is 16. If the pole number P exceeds 16, the magnetic force density $B_e$ becomes gradually smaller. The pole number P in which the magnetic force density $B_e$ exceeds 85 (arb. unit) is in the range from 12 to 30. In this way, the magnetic force density $B_e$ of the magnetic fluxes passing through the rotor side surface 31a can be increased by setting the range of the pole number P to be from 12 to 30. As the magnetic force density $B_e$ is increased, the output torque of the brushless motor is stronger correspondingly to the increase.

Also, in view of a different standpoint, an input current required to obtain a certain output torque can be reduced by setting the range of the pole number P to be from 12 to 30. As well known, the output torque T is proportional to the armature current $I_a$ flowing through the windings $11_1$–$11_{12}$ and the magnetic force density B of the magnetic fluxes in inter-linkage with the windings $11_1$–$11_{12}$, and $$T \alpha I_a \cdot B.$$

That is, $$I_a \alpha T/B. \quad (8)$$

As is understood from the equation (8), if the larger number of magnetic flux lines generated by the permanent magnets 34 come in inter-linkage with the windings $11_1$–$11_{12}$, the armature current $I_a$ required to obtain the certain output torque is reduced. The fact that the armature current $I_a$ can be reduced implies that a capacity of an amplifier for supplying an electric power to the brushless motor can be dropped. Such property is preferable in that the brushless motor is used as a power source for an electric car having a limit of a space.

As can be understood from the above-mentioned facts, the stronger output torque can be obtained by selecting the pole number P as being in the range from 12 to 30. Also, it is possible to reduce the armature current $I_a$ required to obtain the certain output torque.

Figure 10:
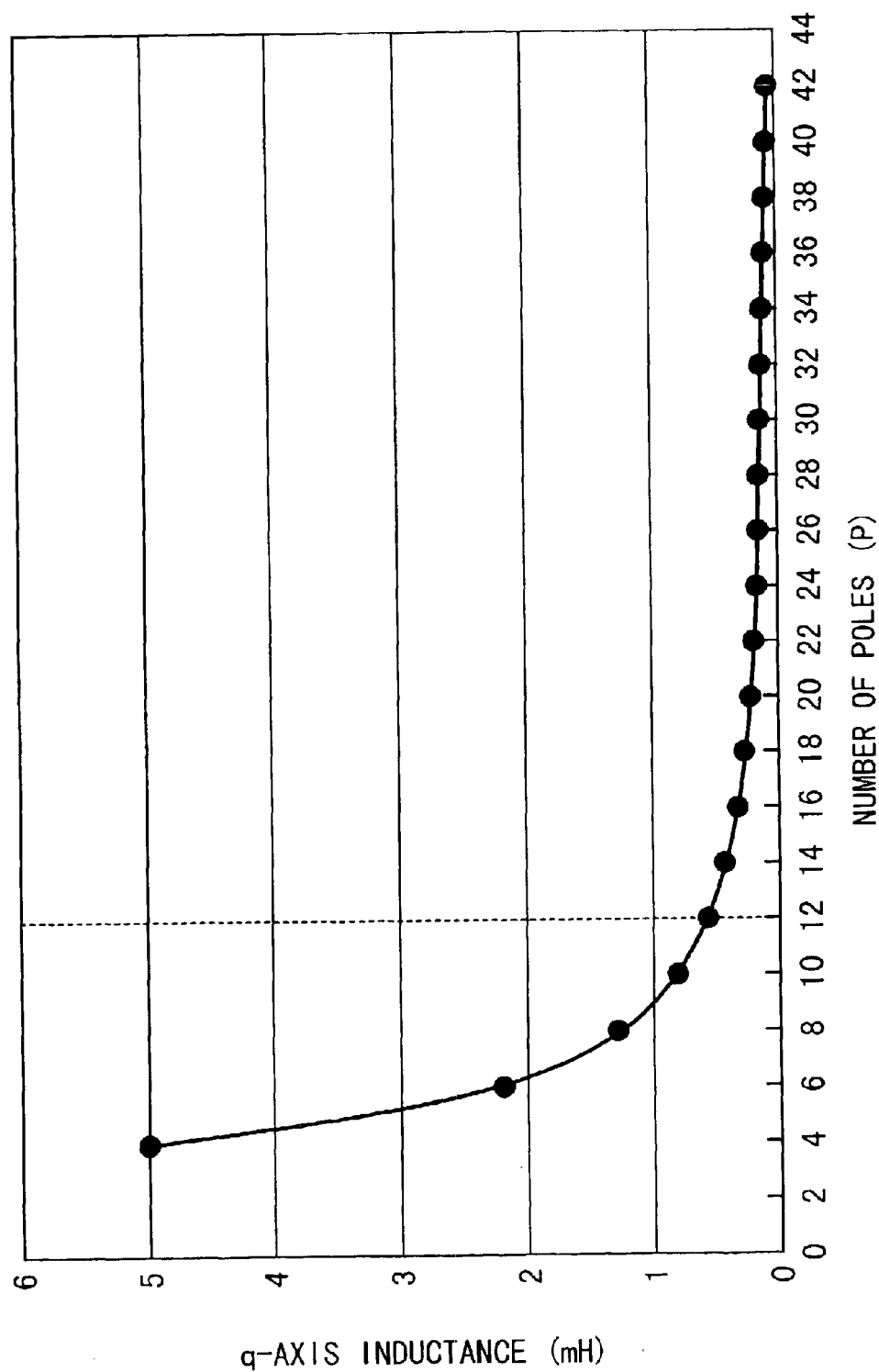
FIG. 10 shows a dependency of a q-axis inductance on a pole number P.

Selecting the pole number P as being 12 or more is also preferable in terms of dropping a quadrature axis inductance $L_q$. FIG. 10 shows the dependency on the pole number P of the quadrature axis inductance $L_q$ under the condition in which the permanent magnets 34 are placed such that the sum of the areas of the opposing surfaces 34a is maximum for each pole number P. In the range in which the pole number P is 12 or less, the quadrature axis inductance $L_q$ is sharply dropped when the pole number P is greater. In the range in which the pole number P is 12 or more, the degree of the drop becomes slow.

Here, as can be understood from the equation (7), the drop in the quadrature axis inductance $L_q$ enables the drop in the input voltage V to the windings $11_1$–$11_{12}$. That is, the input voltage V to the windings $11_1$–$11_{12}$ can be extremely dropped by selecting the pole number P as being 12 or more.

As mentioned above, from the two viewpoints of the increase in the effective magnetic force density $B_e$ and the drop in the input voltage V, it can be understood that the pole number P of the brushless motor is desired to be in the range from 12 to 30.

The brushless motor in this embodiment satisfies the above-mentioned conditions, the number of the poles being 14, and the number of the slots 9 being 12. In the brushless motor in this embodiment, the number of the poles and the numbers of the slots may be any combination besides the 14 poles and the 12 slots. However, from the viewpoint of the miniaturization and the higher output, it is desired to employ the structure composed of the 14 poles and the 12 slots, as described in this embodiment.

Moreover, in the brushless motor, the permanent magnets 34 are placed at positions as described below so that the property is improved.

The positions of the permanent magnets 34 are selected such that the embedded amount x satisfies the following equation:

$$x \leq D/10, \quad (9)$$

$$D = 2\pi r/P,$$

r: the radius of the rotor 31, and

P: the pole number (the number of the permanent magnets 34).

The small embedded amount x implies that the permanent magnets 34 and the rotor side surface 31a are closer to each other. By the way, the condition of the equation (9) has the same meaning as the establishment of the following equation:

$$d \geq r - D/10, \quad (9')$$

with respect to the distance d between the opposing surface 34a and the center 11b of the rotor 31. The longer distance d implies that the permanent magnets 34 are further closer to the rotor side surface 31a.

Figure 11:
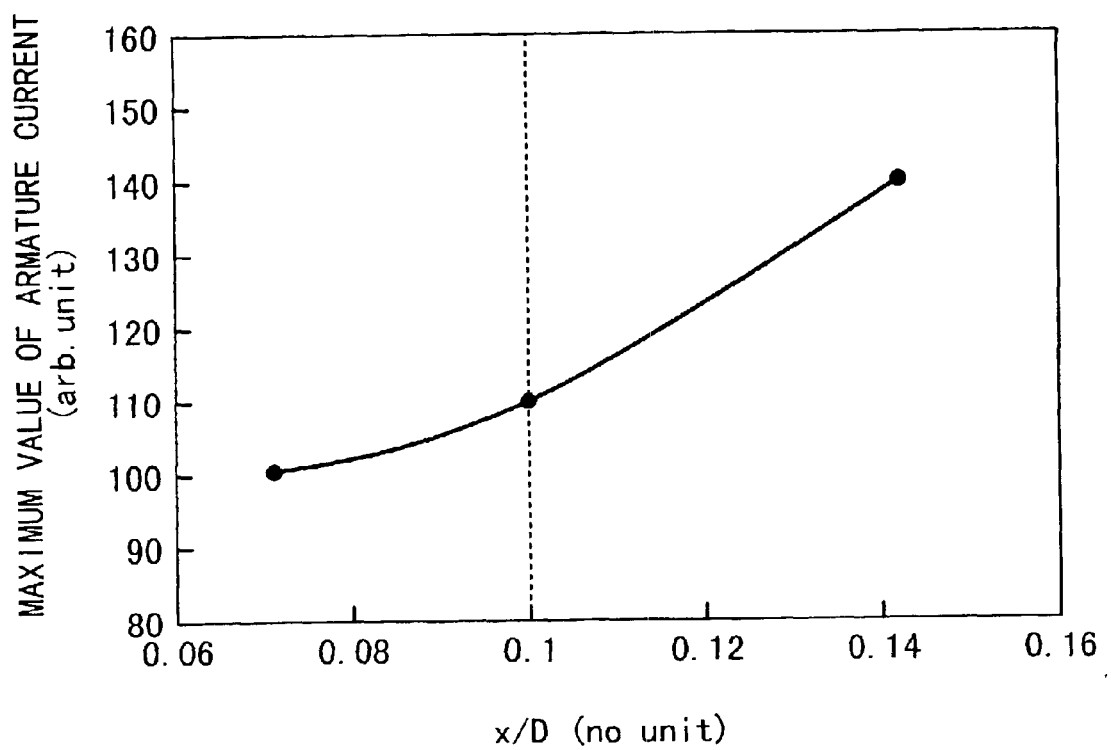
FIG. 11 shows a dependency of an armature current $I_a$ on an embedded amount x.

FIG. 11 shows the dependency on the embedded amount x of the armature current $I_a$ flowing through the windings $11_1$–$11_{12}$ required to generate a certain torque. FIG. 11 shows a peak value of the armature current $I_a$. As shown in FIG. 11, the fact that $x \leq D/10$ results in the extreme drop in the armature current $I_a$ flowing through the windings $11_1$–$11_{12}$.

In other words, the positions of the permanent magnets 34 are selected so as to establish the following equation:

$$(L_q - L_d)/L_d \leq 0.3. \quad (10)$$

Figure 12:
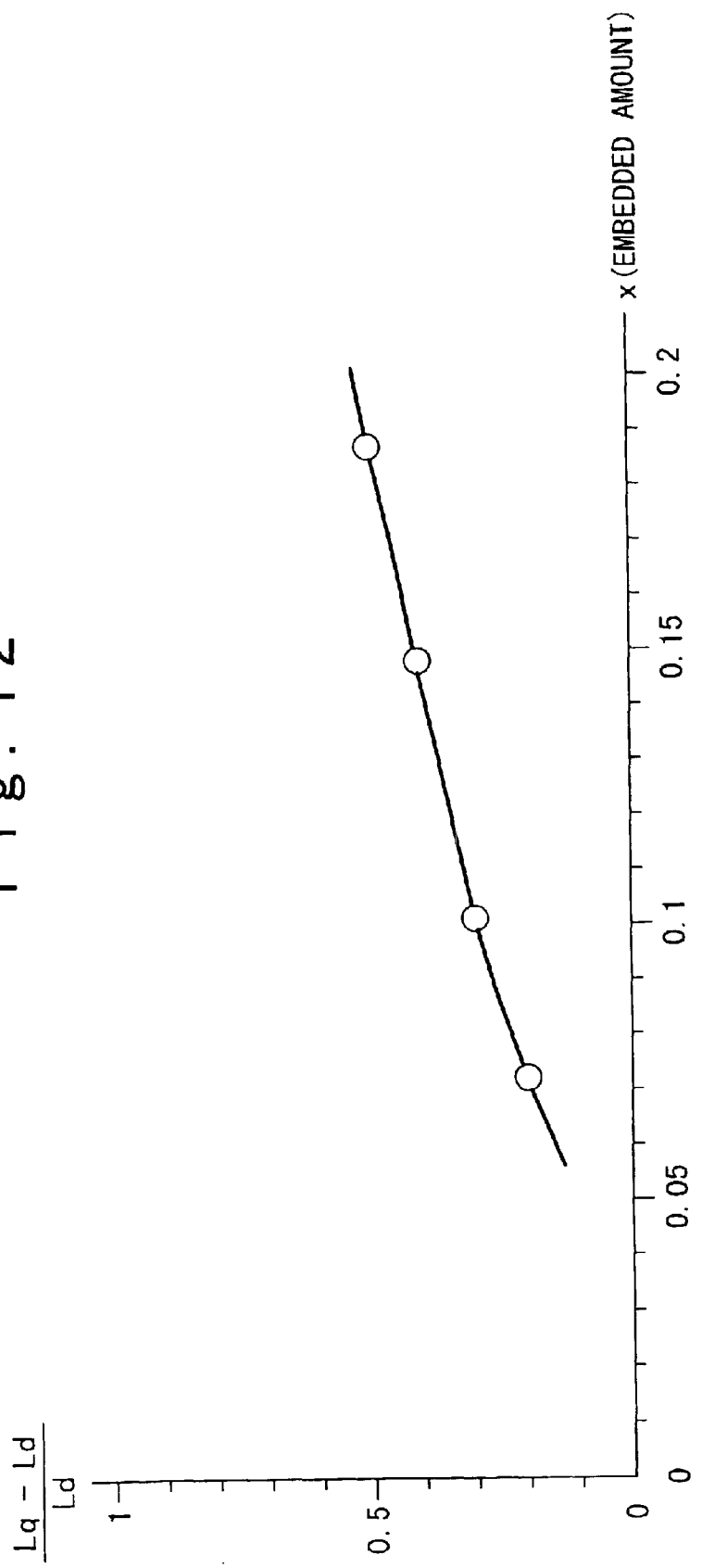
FIG. 12 shows a relation between an embedded amount x and $(L_q - L_d)/L_d$.

FIG. 12 shows the correspondence between the embedded amount x and the $(L_q - L_d)/L_d$. The embedded amount x and $(L_q - L_d)/L_d$ correspond to each other in a one-to-one relationship. The smaller the embedded amount x, the smaller the $(L_q - L_d)/L_d$. When $x = D/10$, $(L_q - L_d)/L_d = 0.3$. The equation (9) corresponds to the equation (10) in a one-to-one relationship.

On the contrary, even if the structure of the rotor iron core 33 and the positions of the permanent magnets 34 are different from the above-mentioned cases, if they are selected so as to satisfy the condition of the equation (10), it is possible to obtain the effect similar to that of the case when the shape of the rotor iron core 33 and the positions of the permanent magnets 34 are equal to those of the above-mentioned case.

Here, the following equation:

$$L_q - L_d \geq 0, \quad (11)$$

preferably holds. This is because the output torque is reduced when $L_q - L_d < 0$, as can be understood from the equation (1).

That is, it preferably satisfies the following equation:

$$0 \leq (L_q - L_d)/L_d \leq 0.3 \quad (12)$$

Third Embodiment

A brushless motor in the third embodiment is the brushless DC motor having the structure similar to that of the second embodiment. In the brushless motor in the third embodiment, the structure of a rotor differs from those of the first and second embodiments. In particular, the structure of a rotor iron core differs from those of the first and second embodiments. The other portions in the third embodiment are equal to those of the first and second embodiments.

Figure 13:
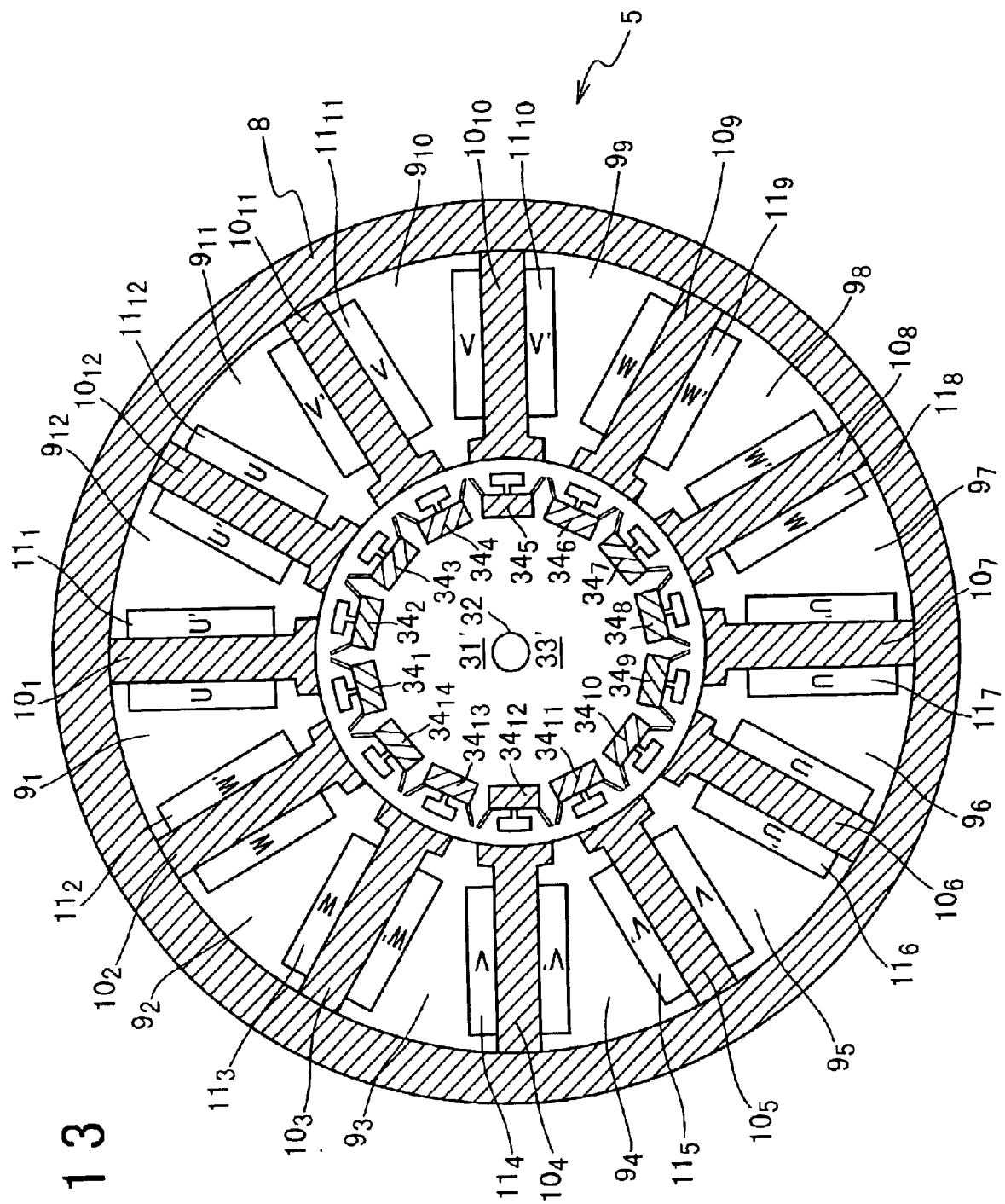
FIG. 13 shows a configuration of a brushless motor in a third embodiment.

FIG. 13 shows the structure of the brushless motor in the third embodiment. The brushless motor in the second embodiment is provided with a rotor 31' and a stator 5. The structure of the stator 5 is equal to that explained in the first embodiment.

Figure 14:
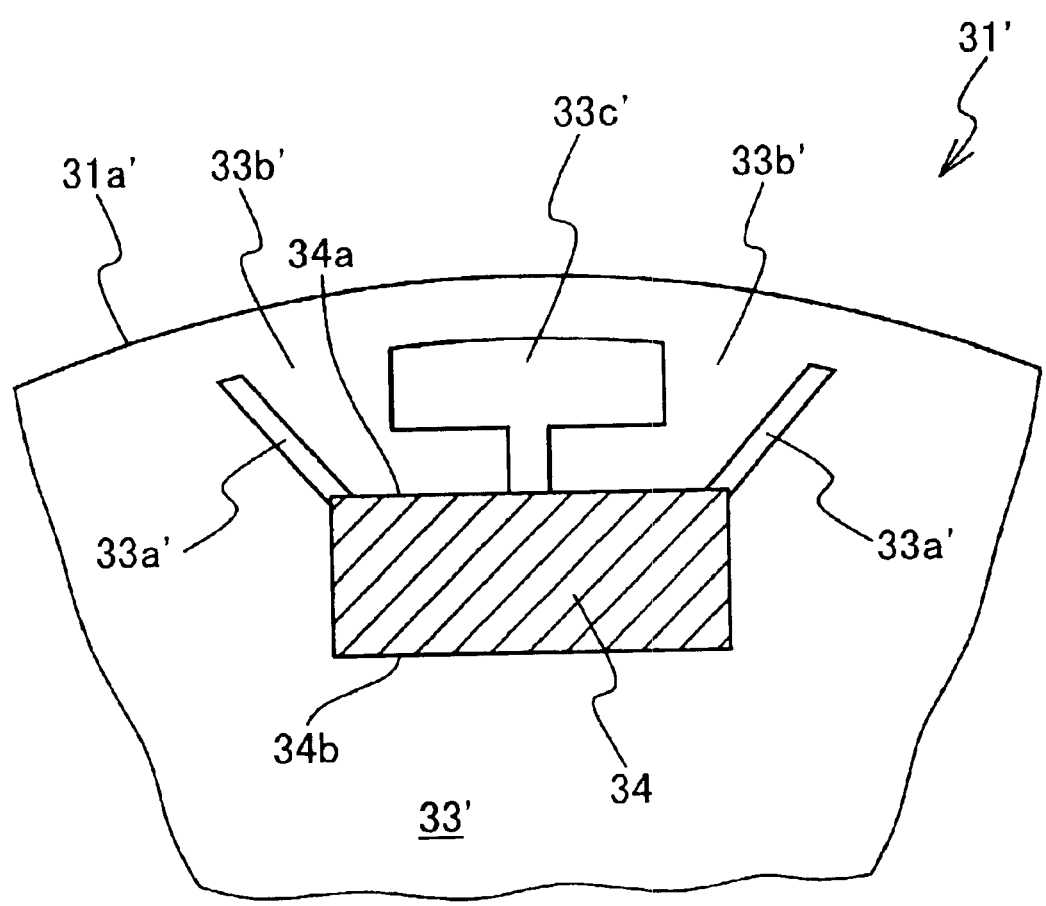
FIG. 14 is an expanded view showing a configuration of a rotor 31'.

FIG. 14 is an expanded view showing a part of the rotor 31'. The rotor 31' includes a rotor iron core 33' and the permanent magnets 34. The permanent magnet 34 has the opposing surface 34a opposite to the rotor side surface 31a of the rotor 31 and the opposing surface 34b opposed to the center 11b of the rotor 31. The two magnetic poles of the permanent magnet 34 are located on the opposing surfaces 34a, and 34b. The permanent magnets 34 generate the magnetic flux lines in the radius direction of the rotor 31'.

The North poles of the permanent magnets $34_1$, $34_3$, $34_5$, $34_7$, $34_9$, $34_{11}$, and $34_{13}$ among the permanent magnets 34 are located on the outer side in the radius direction of the rotor 31, and their South poles are located on the inner side of the rotor 31. On the other hand, the South poles of the permanent magnets $34_2$, $34_4$, $34_6$, $34_8$, $34_{10}$, $34_{12}$, $34_{14}$ among the permanent magnets 34 are located on the outer side in the radius direction of the rotor 31, and their North poles are located on the inner side in the radius direction of the rotor 31. That is, the two permanent magnets adjacent to each other among the permanent magnets 34 generate the magnetic force lines in the directions opposite to each other.

The permanent magnet 34 is placed in the vicinity of a rotor side surface 31a'. Although the permanent magnet 34 is placed in the vicinity of the rotor side surface 31a', it does not face on the rotor side surface 31a. The permanent magnet 34 is embedded in the rotor iron core 33'. The permanent magnet 34 is substantially the rectangular parallelepiped. The rotor side surface 31a and the permanent magnet 34 are located the closest to each other at the end portion 34c.

The rotor 31' having the above-mentioned structure increases the number of the magnetic flux lines in inter-linkage with the stator 5 after passing through the rotor side surface 31a, among the magnetic flux lines generated by the permanent magnets 34.

Here, slits 33a' are formed in the rotor iron core 33'. The slits 33a' extend from the end portions 34c of the permanent magnets 34 towards a rotor side 11'. However, the slits 33a' do not reach the rotor side 11'.

The slits 33a' further reduce the number of the magnetic flux lines closed within the rotor 31', among the magnetic flux lines generated by the permanent magnets 34. Thus, the brushless motor in the third embodiment can obtain the strong magnet torque, similarly to the second embodiment.

Also, the rotor iron core 33' has a direct axis magnetic flux line induction body 33b' located between the permanent magnets 34 and the rotor side surface 31a. The direct axis magnetic flux line induction body 33b' extends from the rotor side surface 31a' to a direct axis (d-axis) direction of the rotor 31', and reaches the surface of the permanent magnets 34. The magnetic flux lines in the direct axis direction generated by the permanent magnets 34 pass through the direct axis magnetic flux line induction body 33b', and reach the rotor side surface 31a', and further come in inter-linkage with the stator 5. The direct axis magnetic flux line induction body 33b' determines the direct axis inductance $L_d$ of the rotor 31'. The direct axis inductance $L_d$ is especially determined by a width in a circumference direction of the direct axis magnetic flux line induction body 33b'.

The width of the circumference direction of the direct axis magnetic flux line induction body 33b' is selected such that $(-\omega L_d + V_c)$ is substantially 0. Here, $\omega$ is the angular frequency of the rotation of the rotor 31', $V_c$ is the induced voltage in the windings $11_1$–$11_{12}$ by the rotation of the rotor. As can be understood from the equation (5), since $(-\omega L_d + V_c)$ is selected as being substantially 0, it is possible to drop the input voltage V of the brushless motor.

Moreover, a gap 33c' is formed in the rotor iron core 33'. The gap 33c' is located between the permanent magnets 34 and the rotor side surface 31a. The gap 33c' extends in a quadrature axis (q-axis) direction. This results in the decrease in a quadrature axis inductance $L_q$ of the rotor 31'. As can be understood from the equation (5), the decrease in the quadrature axis inductance $L_q$ leads to the decrease in the input voltage V of the brushless motor.

In this way, in the brushless motor in the third embodiment, it is possible to further decrease the input voltage V of the brushless motor.

Even in the case of the third embodiment, similarly to the second embodiment, the positions of the permanent magnets 34 and the shape of the rotor iron core 33' are desired to be selected so as to establish the following equation:

$$0 \leq (L_q - L_d)/L_d \leq 0.3. \tag{13}$$

Figure 15:
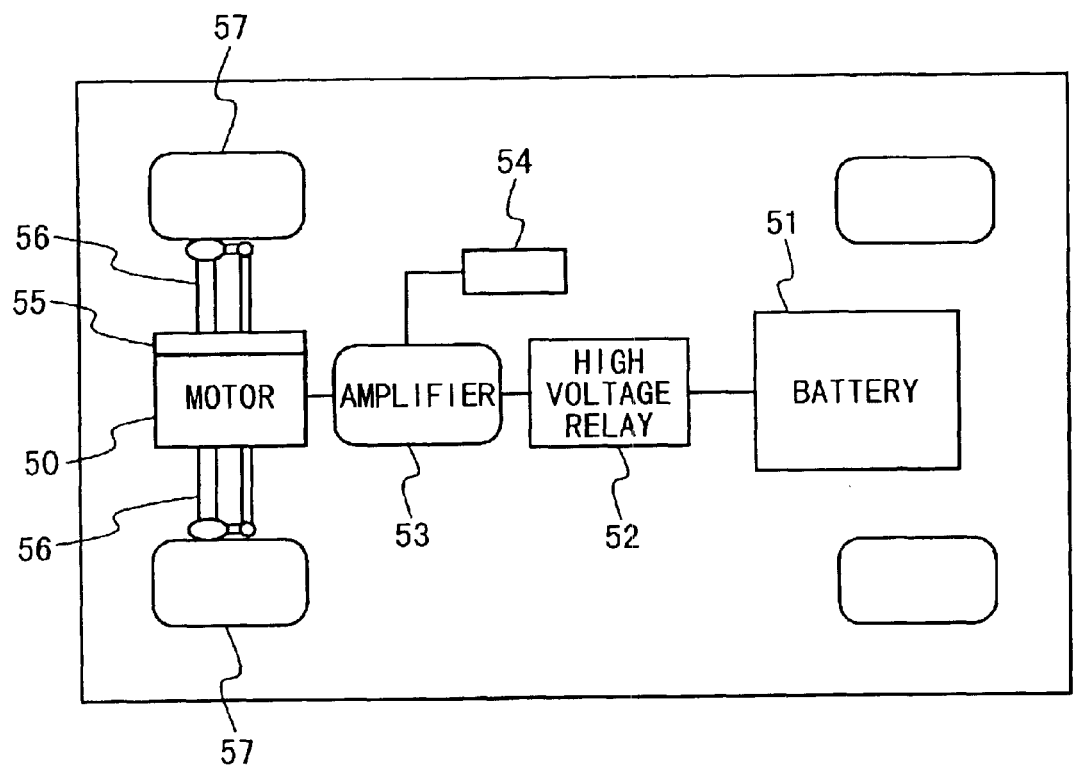
FIG. 15 shows an electric car including a brushless motor.

Preferably, the brushless motor based on the first, second or third embodiment is used to drive the electric car. FIG. 15 shows the electric car including the brushless motor in the first or second embodiment. A battery 51 is installed in the electric car. The battery 51 is connected to a high voltage relay 52. The high voltage relay 52 sends a voltage to respective units of the electric car. An amplifier 53 sends a voltage to a brushless motor 50 on the basis of a movement of an accelerator pedal 54. The brushless motor based on any of the first, second and third embodiments is placed as the brushless motor 50. The brushless motor 50 drives drive wheels 57 through a transmission 55 and drive shafts 56. In the electric car including the brushless motor 50, the feature of the brushless motor 50 enables a capacity of the amplifier 53 to be reduced.

Figure 16:
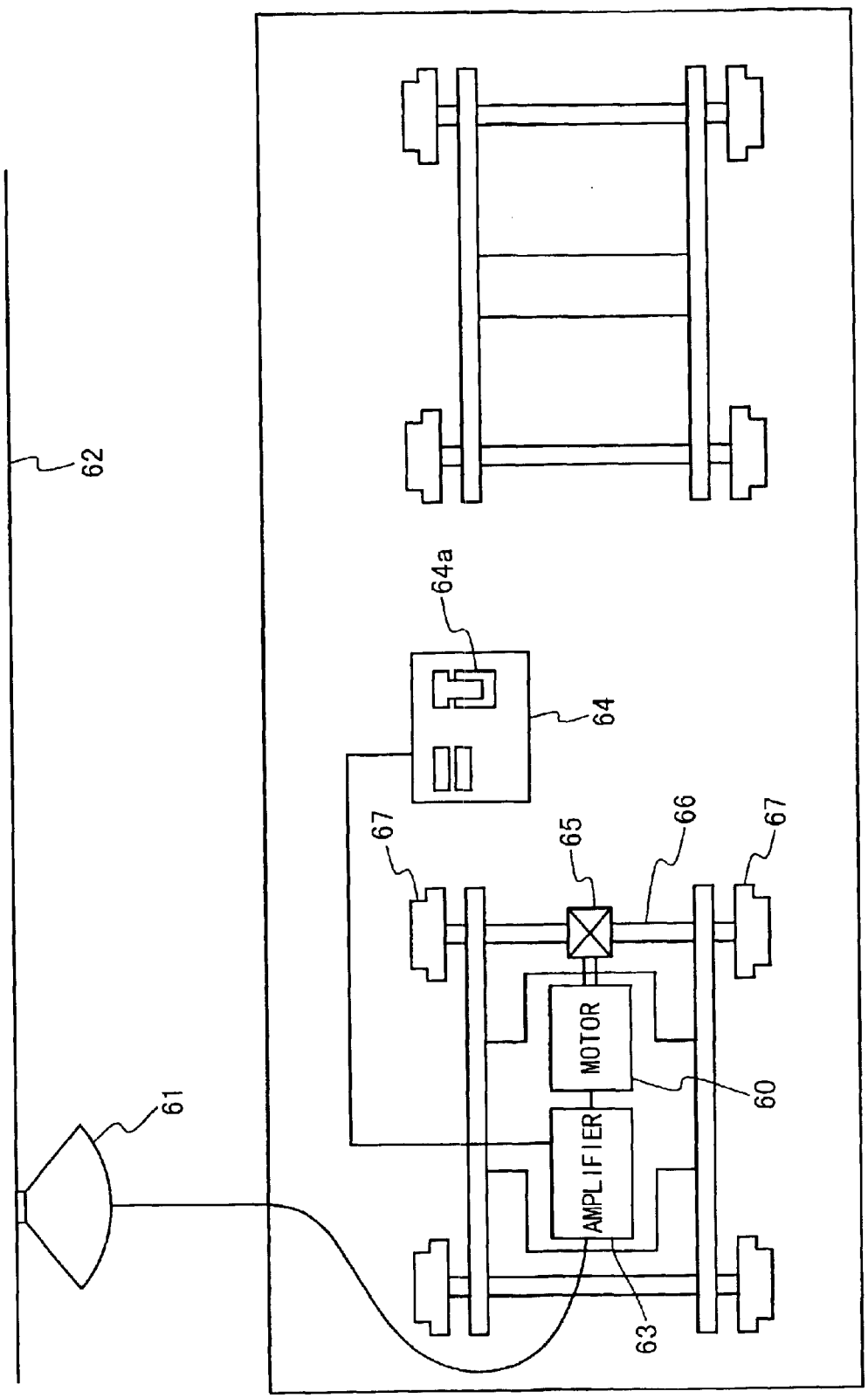
FIG. 16 shows an electric train including a brushless motor.

Moreover, preferably, the brushless motor based on the first, second or third embodiment is placed in the electric train. FIG. 16 shows the configuration of the electric train including the brushless motor in the embodiment. A pantograph 61 is installed in the electric train. The pantograph 61 comes in contact with a wiring 62 to which a power supply voltage is sent. Then, it sends the power supply voltage to an amplifier 63. The amplifier 63 is connected to a controller 64. A throttle lever 64a is installed in the controller 64. The amplifier 63 sends an input voltage to a brushless motor 60, on the basis of a movement of the throttle lever 64a. The brushless motor based on any of the first, second and third embodiments is placed as the brushless motor 60. The brushless motor 60 drives drive wheels 67 through a transmission 65 and drive shafts 66. In the electric train including the brushless motor 60, the feature of the brushless motor 60 enables a capacity of the amplifier 63 to be reduced.

As mentioned above, according to the present invention, it is possible to increase the output torque of the brushless motor.

According to the present invention, it is possible to suppress the torque ripple of the brushless motor.

According to the present invention, it is possible to reduce the armature current of the brushless motor.

Also, according to the present invention, it is possible to drop the input voltage of the brushless motor.

Moreover, according to the present invention, it is possible to miniaturize the brushless motor.

Industrial Applicability

Brushless Motor

What is claimed is:

1. A brushless motor comprising:
a stator; and
a rotor having a lateral surface opposed to said stator, wherein said stator includes:
a plurality of radially extending iron cores, and
a plurality of windings for respectively generating magnetic fields in said iron cores,
wherein said rotor includes:
a plurality of permanent magnets, and
magnetic force line induction bodies located between said permanent magnets and said lateral surface, and
wherein a number of said windings is N, and a number of said permanent magnets is P, and P is greater than N.

2. A brushless motor comprising:
a stator; and
a rotor having a lateral surface opposed to said stator, wherein said stator includes:
a plurality of radially extending iron cores, and
a plurality of windings for respectively generating magnetic fields in said iron cores,
wherein said rotor includes:
a plurality of permanent magnets, and
magnetic force line induction bodies located between said permanent magnets and said lateral surface, and
wherein an output torque T of said brushless motor is given by a following equation:

$$T=p\{\phi \cdot I_a \cdot \cos(\beta)+(L_q-L_d)I_a^2 \cdot \sin(2\beta)/2\},$$

p being a half of a number of said plurality of permanent magnets, $\phi$ being a maximum armature flux linkage generated by said plurality of permanent magnets, $I_a$ being an armature current, $\beta$ being a phase of said armature current, $L_d$ being a direct-axis inductance of said rotor, and $L_q$ being a quadrature-axis inductance of said rotor, while the following equation:

$$L_q \approx L_d,$$

does not hold.

3. A brushless motor according to claim 1, wherein said rotor has a plurality of holes into each of which said plurality of permanent magnets are inserted in an axis direction of said rotor.

4. A brushless motor according to claim 1, wherein three-phase direct currents are provided for said plurality of windings.

5. A brushless motor according to claim 4, wherein said plurality of windings include:
a first set of windings, and
a second set of windings, and
wherein said first set of three-phase windings and said second set of three-phase windings are arranged to be symmetrical with respect to a line.

6. A brushless motor comprising:
a stator; and
a rotor having a lateral surface opposed to said stator, wherein said stator includes:
a plurality of radially extending iron cores, and
a plurality of windings for respectively generating magnetic fields in said iron cores,
wherein said rotor includes:
a plurality of permanent magnets, and
magnetic force line induction bodies located between said permanent magnets and said lateral surface,
wherein three-phase direct currents are provided for said plurality of windings,
wherein said windings include:
a first group of three-phase windings, and
a second group of three-phase windings, and
wherein windings having said same phase of said first and second groups of three-phase windings are adjacent to each other in the same rotation direction, and
wherein said first group of three-phase windings include:
a first set of three-phase windings, and
a second set of three-phase windings, and
said first set of three-phase windings and said second set of three-phase windings are arranged to be approximately geometrically symmetrical with respect to a line, said second group of three-phase windings include another first set of three-phase windings and another second set three-phase windings, and said other first set three-phase windings and said other second set of three-phase windings are arranged to be approximately geometrically symmetrical with respect to a line.

7. A brushless motor according to claim 1, wherein one of prime factors of said P is greater than any of prime factors of said N.

8. A brushless motor according to claim 7, wherein said prime factors of said N includes 2 and 3, and
said prime factor of said P includes 2 and 7.

9. A brushless motor according to claim 1, said P satisfies the following equation:

$$12 \leq P \leq 30.$$

10. A brushless motor according to claim 1, wherein said N is 12 and said P is 14.

11. A brushless motor according to claim 1, wherein a section of said permanent magnet on a flat plane vertical to a central axis of said rotor is rectangular,
said rectangle has short sides and long sides longer than said short sides, and
said long sides are opposed to said lateral surface.

12. A brushless motor comprising:
a stator; and
a rotor having a lateral surface opposed to said stator, wherein said stator includes:
a plurality of radially extending iron cores, and
a plurality of windings for respectively generating magnetic fields in said iron cores,
wherein said rotor includes:
a plurality of permanent magnets, and
magnetic force line induction bodies located between said permanent magnets and said lateral surface, and
wherein said permanent magnet has a shape of a substantially rectangular parallelepiped, and
a distanced between a center of said rotor and magnetic pole surfaces opposed to said lateral surface among surfaces of said plurality of permanent magnets satisfies a following equation:

$$d \geq r - D/10,$$

where $D = \pi r/P$, r being a radius of said rotor, and P is a number of said permanent magnets.

13. A brushless motor comprising:

a stator; and a rotor having a lateral surface opposed to said stator, wherein said stator includes:

a plurality of radially extending iron cores, and a plurality of windings for respectively generating magnetic fields in said iron cores, wherein said rotor includes:

a plurality of permanent magnets, and magnetic force line induction bodies located between said permanent magnets and said lateral surface, and wherein a following equation:

$$0 \leq (L_q - L_d)/L_d \leq 0.3,$$

holds, where $L_q$ is a quadrature-axis inductance of said rotor, and $L_d$ is a direct-axis inductance of said rotor.

* * * * *